(12) United States Patent
Cochran

(10) Patent No.: US 8,566,446 B2
(45) Date of Patent: Oct. 22, 2013

(54) WRITE OPERATION CONTROL IN STORAGE NETWORKS

(75) Inventor: Robert A. Cochran, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2518 days.

(21) Appl. No.: 10/767,130

(22) Filed: Jan. 28, 2004

(65) Prior Publication Data

US 2005/0198032 A1 Sep. 8, 2005

(51) Int. Cl.
*G06F 17/30* (2006.01)
(52) U.S. Cl.
USPC .......................................... 709/226; 709/217
(58) Field of Classification Search
USPC .................................. 709/229, 226, 217–219
See application file for complete search history.

(56) References Cited

U.S. PATENT DOCUMENTS

| | | | |
|---|---|---|---|
| 6,594,745 B2 | 7/2003 | Grover | |
| 6,606,690 B2 | 8/2003 | Padovano | |
| 7,003,688 B1 * | 2/2006 | Pittelkow et al. | 714/7 |
| 7,222,176 B1 * | 5/2007 | Laurent et al. | 709/226 |
| 7,272,661 B2 * | 9/2007 | Sato | 709/242 |
| 7,284,030 B2 * | 10/2007 | Ackaouy et al. | 709/202 |
| 2002/0016827 A1 | 2/2002 | McCabe et al. | |
| 2002/0103968 A1 | 8/2002 | Grover | |
| 2002/0104008 A1 | 8/2002 | Cochran et al. | |
| 2002/0199073 A1 | 12/2002 | Tamura et al. | |
| 2003/0074492 A1 | 4/2003 | Cochran | |
| 2003/0079092 A1 | 4/2003 | Cochran et al. | |
| 2003/0079102 A1 | 4/2003 | Lubbers et al. | |
| 2003/0084241 A1 | 5/2003 | Lubbers et al. | |
| 2003/0120676 A1 | 6/2003 | Holavanahalli et al. | |
| 2003/0145179 A1 | 7/2003 | Gabber et al. | |
| 2004/0054748 A1 * | 3/2004 | Ackaouy et al. | 709/214 |

FOREIGN PATENT DOCUMENTS

| | | |
|---|---|---|
| JP | 2003 167683 | 6/2003 |
| JP | 2003 316616 | 11/2003 |
| JP | 2003 330622 | 11/2003 |
| WO | WO 03083678 | 10/2003 |

* cited by examiner

*Primary Examiner* — Kenneth R Coulter

(57) ABSTRACT

An exemplary storage network and methods of operation are disclosed. The exemplary storage network comprises a plurality of storage cells. At least one storage cell comprises physical storage media and a storage media controller that controls data transfer operations with the storage media. The exemplary storage network further comprises a plurality of host computers configurable to execute write operations to at least one storage cell, at least one write control server that regulates the write operations of one or more host computers, and a communication network that provides communication connections between the storage cells, the host computers, and the write control server. In exemplary methods of operation the write control server regulates write access by the host computers. In another exemplary method of operation the write control server broadcasts a write failure signal to one or more host computers in the network.

26 Claims, 7 Drawing Sheets

WRITE OPERATION CONTROL IN STORAGE NETWORKS

TECHNICAL FIELD

The described subject matter relates to electronic computing, and more particularly to systems and methods for managing storage in electronic computing systems.

BACKGROUND

Effective collection, management, and control of information have become a central component of modern business processes. To this end, many businesses, both large and small, now implement computer-based information management systems.

Data management is an important component of computer-based information management systems. Many users implement storage networks to manage data operations in computer-based information management systems. Storage networks have evolved in computing power and complexity to provide highly reliable, managed storage solutions that may be distributed across a wide geographic area.

Data redundancy is one aspect of reliability in storage networks. A single copy of data is vulnerable if the network element on which the data resides fails. If the vulnerable data or the network element on which it resides can be recovered, then the loss may be temporary. However, if either the data or the network element cannot be recovered then the vulnerable data may be lost permanently.

Storage networks implement remote copy procedures to provide data redundancy and failover procedures to provide data consistency in the event of a failure of one or more network elements. Remote copy procedures replicate one or more data sets resident on a first storage site onto at least a second storage site. A data consistency group (DCG) is a data set comprising a plurality of storage units, each containing a portion of an aggregated data set, with each storage unit having the potential to be individually replicated. The storage units may be logical or physical. A DCG implemented at the disk array level enables data sets to be aggregated across multiple logical units with the assurance that any unsuccessful replication will immediately halt all local and remote write operations, such that the aggregated primary data set and the aggregated secondary data set remain consistent, and therefore useful for continuing operations.

Large storage networks may comprise dozens, or even hundreds of storage cells, and may have hundreds, or even thousands of host computers that execute write operations to data sets in the storage network. Effective storage management techniques must ensure data consistency in DCGs implemented in complex storage networks.

SUMMARY

In an exemplary implementation a storage network is provided. The storage network comprises a plurality of storage cells, at least one storage cell comprising physical storage media and a storage media controller that controls data transfer operations with the storage media; a plurality of host computers configurable to execute write operations to at least one storage cell; at least one write control server that regulates the write operations of one or more host computers; and a communication network that provides communication connections between the storage cells, the host computers, and the write control server.

DETAILED DESCRIPTION

Figure 1:
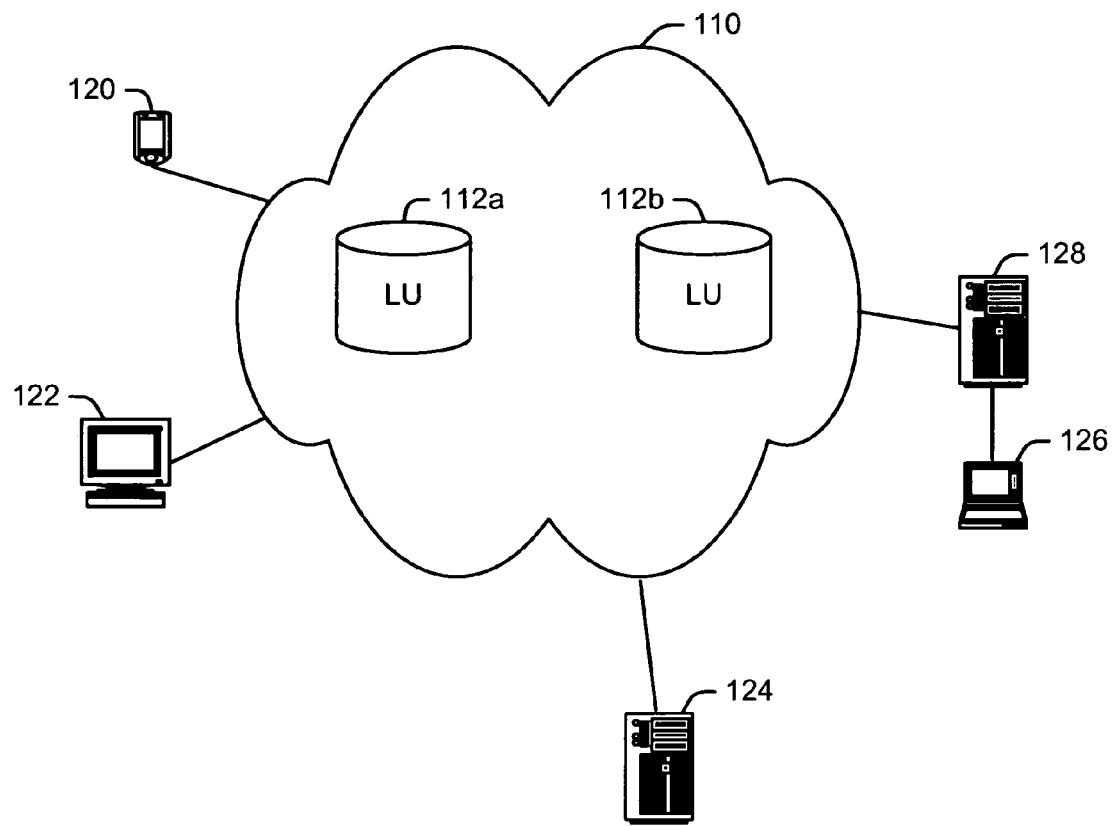
FIG. 1 is a schematic illustration of an exemplary implementation of a networked computing system that utilizes a storage network.

Described herein are exemplary storage network architectures and methods for unified write block ordering in copy operations. The methods described herein may be embodied as logic instructions on a computer-readable medium. When executed on a processor, the logic instructions cause a general purpose computing device to be programmed as a special-purpose machine that implements the described methods.
Exemplary Network Architecture FIG. 1 is a schematic illustration of an exemplary implementation of a networked computing system 100 that utilizes a storage network. The storage network comprises a storage pool 110, which comprises an arbitrarily large quantity of storage space. In practice, a storage pool 110 has a finite size limit determined by the particular hardware used to implement the storage pool 110. However, there are few theoretical limits to the storage space available in a storage pool 110.

A plurality of logical disks (also called logical units or LUs) 112a, 112b may be allocated within storage pool 110. Each LU 112a, 112b comprises a contiguous range of logical addresses that can be addressed by host devices 120, 122, 124 and 128 by mapping requests from the connection protocol used by the host device to the uniquely identified LU 102. As used herein, the term "host" comprises a computing system(s) that utilize storage on its own behalf, or on behalf of systems coupled to the host. For example, a host may be a supercomputer processing large databases or a transaction processing server maintaining transaction records. Alternatively, a host may be a file server on a local area network (LAN) or wide area network (WAN) that provides storage services for an enterprise. A file server may comprise one or more disk controllers and/or RAID controllers configured to manage multiple disk drives. A host connects to a storage network via a communication connection such as, e.g., a Fibre Channel (FC) connection.

A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which are also hosts, may logically couple directly to LUs 112a, 112b. Hosts 120-128 may couple to multiple LUs 112a, 112b, and LUs 112a, 112b may be shared among multiple hosts. Each of the devices shown in FIG. 1 may include a memory, mass storage, and a degree of data processing capability sufficient to manage a network connection.

Figure 2:
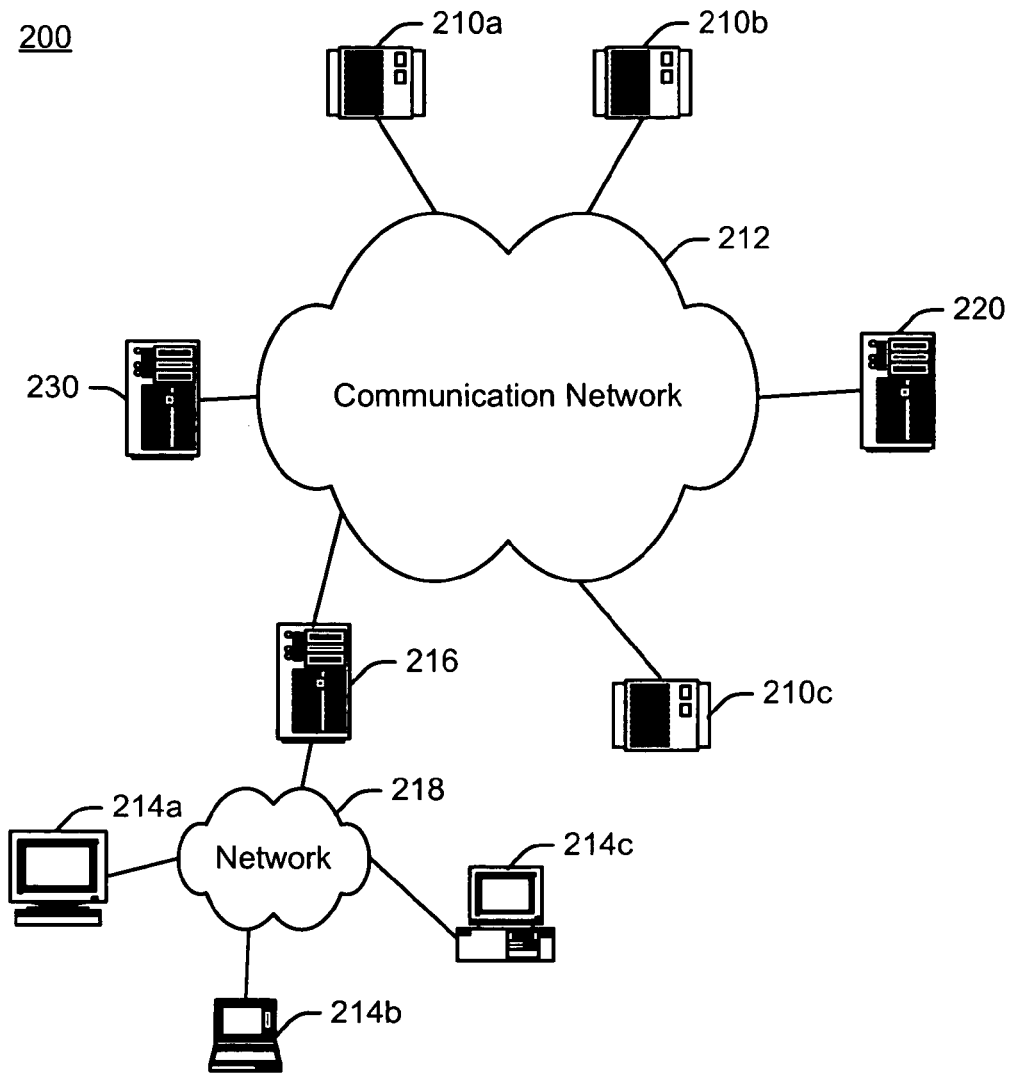
FIG. 2 is a schematic illustration of an exemplary implementation of a storage network.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. Exemplary storage devices include the STORAGEWORKS line of storage devices commercially available form Hewlett-Packard Corporation of Palo Alto, Calif., USA. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220. Clients 241a, 214b, 214c may be connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. A switching fabric comprising a single FC switch can interconnect 256 or more ports, providing a possibility of hundreds of storage cells 210a, 210b, 210c in a single storage network.

Hundreds or even thousands of host computers may connect to storage network 200 to access data stored in storage cells 210a, 210b, 210c. Storage network 200 further comprises at least one write control server 230 that regulates write operations of host computers that connect to storage network 200. Operation of the write control server is explained in detail below.

Figure 3:
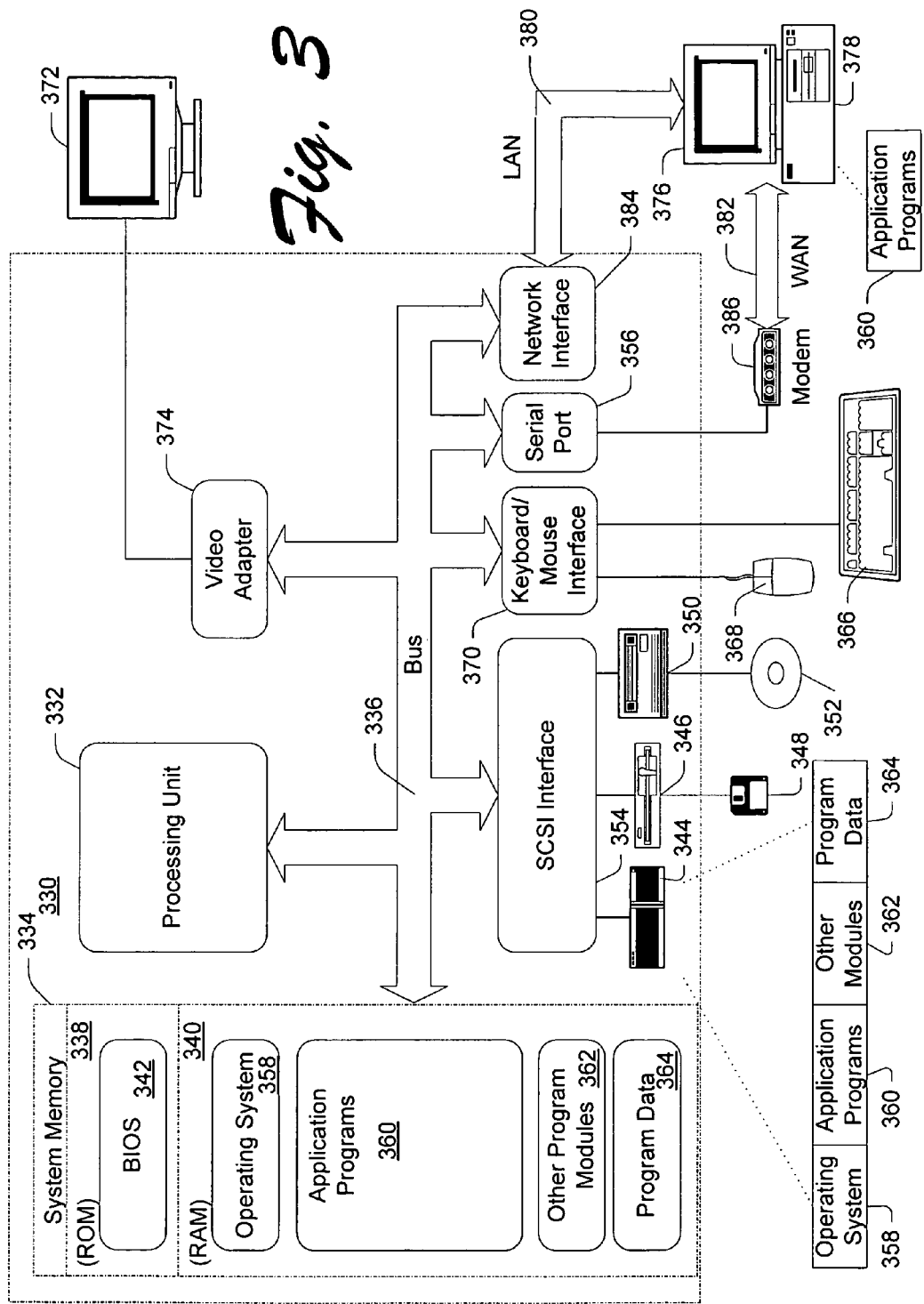
FIG. 3 is a schematic illustration of an exemplary implementation of a computing device that can be utilized to implement a host.

Hosts 216, 220 and write control server 230 may be embodied as server computers. FIG. 3 is a schematic illustration of an exemplary computing device 330 that can be utilized to implement a host. Computing device 330 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 330, such as during start-up, is stored in ROM 338.

Computing device 330 further includes a hard disk drive 344 for reading from and writing to a hard disk (not shown), and may include a magnetic disk drive 346 for reading from and writing to a removable magnetic disk 348, and an optical disk drive 350 for reading from or writing to a removable optical disk 352 such as a CD ROM or other optical media. The hard disk drive 344, magnetic disk drive 346, and optical disk drive 350 are connected to the bus 336 by a SCSI interface 354 or some other appropriate interface. The drives and their associated computer-readable media provide nonvolatile storage of computer-readable instructions, data structures, program modules and other data for computing device 330. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 344, magnetic disk 348, optical disk 352, ROM 338, or RAM 340, including an operating system 358, one or more application programs 360, other program modules 362, and program data 364. A user may enter commands and information into computing device 330 through input devices such as a keyboard 366 and a pointing device 368. Other input devices (not shown) may include a microphone, joystick, game pad, satellite dish, scanner, or the like. These and other input devices are connected to the processing unit 332 through an interface 370 that is coupled to the bus 336. A monitor 372 or other type of display device is also connected to the bus 336 via an interface, such as a video adapter 374.

Computing device 330 may operate in a networked environment using logical connections to one or more remote computers, such as a remote computer 376. The remote computer 376 may be a personal computer, a server, a router, a network PC, a peer device or other common network node, and typically includes many or all of the elements described above relative to computing device 330, although only a memory storage device 378 has been illustrated in FIG. 3. The logical connections depicted in FIG. 3 include a LAN 380 and a WAN 382.

When used in a LAN networking environment, computing device 330 is connected to the local network 380 through a network interface or adapter 384. When used in a WAN networking environment, computing device 330 typically includes a modem 386 or other means for establishing communications over the wide area network 382, such as the Internet. The modem 386, which may be internal or external, is connected to the bus 336 via a serial port interface 356. In a networked environment, program modules depicted relative to the computing device 330, or portions thereof, may be stored in the remote memory storage device. It will be appreciated that the network connections shown are exemplary and other means of establishing a communications link between the computers may be used.

Hosts 216, 220 may include host adapter hardware and software to enable a connection to communication network 212. The connection to communication network 212 may be through an optical coupling or more conventional conductive cabling depending on the bandwidth requirements. A host adapter may be implemented as a plug-in card on computing device 330. Hosts 216, 220 may implement any number of host adapters to provide as many connections to communication network 212 as the hardware and software support.

Generally, the data processors of computing device 330 are programmed by means of instructions stored at different times in the various computer-readable storage media of the computer. Programs and operating systems may distributed, for example, on floppy disks, CD-ROMs, or electronically, and are installed or loaded into the secondary memory of a computer. At execution, the programs are loaded at least partially into the computer's primary electronic memory.

Figure 4:
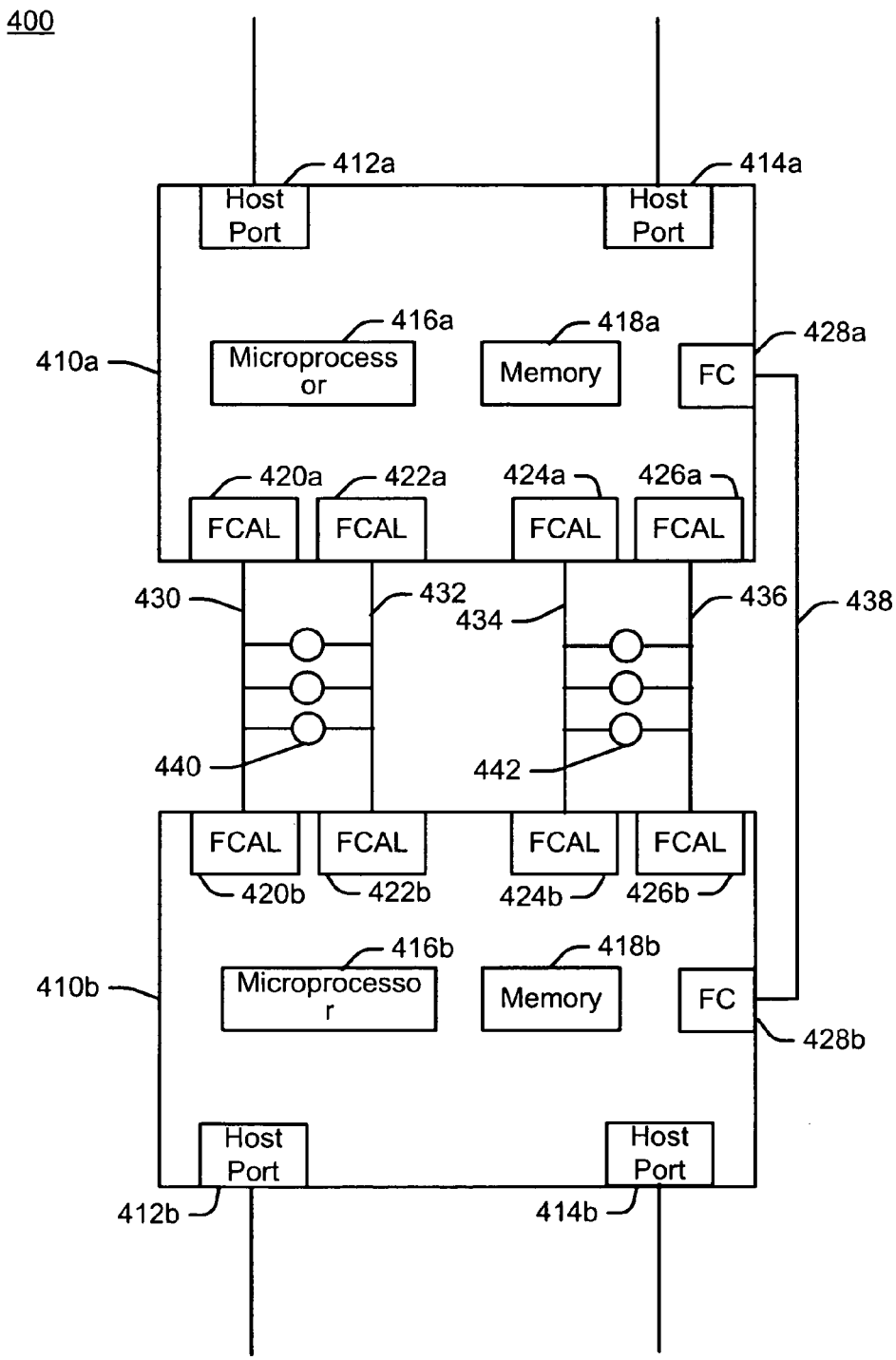
FIG. 4 is a schematic illustration of an exemplary implementation of a storage cell.

FIG. 4 is a schematic illustration of an exemplary implementation of a storage cell 400, such as storage cell 210. Referring to FIG. 4, storage cell 400 includes two Network Storage Controllers (NSCs), also referred to as disk controllers, 410a, 410b to manage the operations and the transfer of data to and from one or more disk arrays 440, 442. NSCs 410a, 410b may be implemented as plug-in cards having a microprocessor 416a, 416b, and memory 418a, 418b. Each NSC 410a, 410b includes dual host adapter ports 412a, 414a, 412b, 414b that provide an interface to a host, i.e., through a communication network such as a switching fabric. In a Fibre Channel implementation, host adapter ports 412a, 412b, 414a, 414b may be implemented as FC N_Ports. Each host adapter port 412a, 412b, 414a, 414b manages the login and interface with a switching fabric, and is assigned a fabric-unique port ID in the login process. The architecture illustrated in FIG. 4 provides a fully-redundant storage cell; only a single NSC is required to implement a storage cell 210.

Each NSC 410a, 410b further includes a communication port 428a, 428b that enables a communication connection 438 between the NSCs 410a, 410b. The communication connection 438 may be implemented as a FC point-to-point connection, or pursuant to any other suitable communication protocol.

In an exemplary implementation, NSCs 410a, 410b further include a plurality of Fiber Channel Arbitrated Loop (FCAL) ports 420a-426a, 420b-426b that implement an FCAL communication connection with a plurality of storage devices, e.g., arrays of disk drives 440, 442. While the illustrated embodiment implement FCAL connections with the arrays of disk drives 440, 442, it will be understood that the communication connection with arrays of disk drives 440, 442 may be implemented using other communication protocols. For example, rather than an FCAL configuration, a FC switching fabric may be used.

Exemplary Operations

Having described various components of an exemplary storage network, attention is now directed to operations of the storage network 200 and components thereof.

In operation, storage capacity provided by the arrays of disk drives 440, 442 in a storage cells 210a, 210b, 210c may be added to the storage pool 110. When an application requires storage capacity, logic instructions on a host computer 128 may establish a LU from storage capacity available on the arrays of disk drives 440, 442 available in one or more storage cells 210a, 210b, 210c. It will be appreciated that because a LU is a logical unit, not a physical unit, the physical storage space that constitutes the LU may be distributed across multiple storage cells 210a, 210b, 210c. Data for the application may be stored on one or more LUs in the storage network.

Storage network 200 may implement remote copy procedures to provide data redundancy for data stored in storage cells 210a, 210b, 210c. By way of example, referring to FIG. 2, a LU resident on storage cell 210a may have a remote copy resident on storage cell 210b, which may be located at an arbitrary distance from storage cell 210a. Additional remote copies of the LU resident on storage cell 210a may be maintained on other storage cells in the storage network 210. Similarly, a LU resident on storage cell 210b may have remote copies on storage cell 210a or 210c, and a LU resident on storage cell 210c may have remote copies on storage cell 210a or 210b. During the remote copy process the information in the LU is transmitted across the switching fabric, sometimes referred to as a "network cloud" to its destination storage cell.

An application that needs access to data in the storage network may launch a read query to a host computer. In response to a read query, the host computer queries the NSC(s) on one or more storage cells in which the requested data resides. The NSC(s) retrieve the requested data from the storage media on which it resides and forwards the data to host computer, which in turn can forward to data to the requesting device.

Write Operations

An application can write data to the storage network 200 by launching a write request to a host computer 216, 220. In response to a write request, a host computer 216, 220 launches a write command to the NSC(s) 410a, 410b in one or more storage cells 210a, 210b, 210c on which the requested data resides. The write command includes the data to be written to the storage network 200. In response to the write command, the NSC(s) 410a, 410b write the data onto the storage media. If the storage network 200 is configured to implement one or more remote copies of stored data, then data from the write operation is contemporaneously written to a second storage cell 210a, 210b, 210c on the storage network. The remote copy operation may be implemented by either a host computer 216, 220 or by the NSC(a) 410a, 410b.

Figure 5:
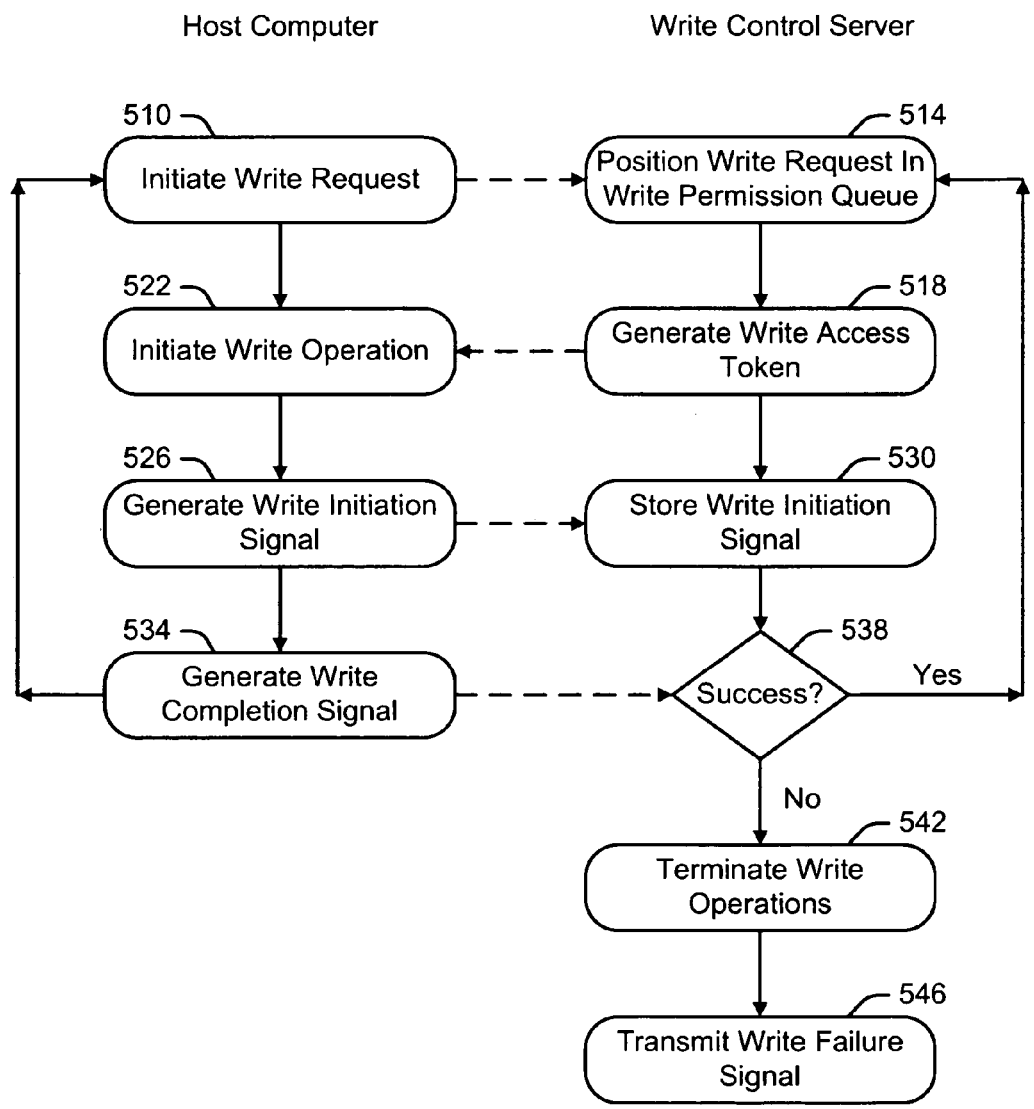
FIG. 5 is a flowchart illustrating operations in a first exemplary implementation for executing write operations in a storage network.

In an exemplary implementation, write operations for a data consistency group in storage network 210 are regulated by write control server 230. FIG. 5 is a flowchart illustrating operations 500 in a first exemplary implementation for executing write operations for a data consistency group in storage network 200. In the exemplary implementation illustrated in FIG. 5, write control server 230 restricts write operations for the data consistency group in storage network 200 to permit only a single host computer 216, 220 to execute a write operation at any point in time.

At operation 510 a host computer initiates a write request, which is transmitted to write control server 230, e.g., over communication network 212. Write control server 230 receives the write request and, at operation 514, positions the write request in a write permission queue (WPQ), which comprises a list of write requests received from host computers 216, 220 that connect to storage network 200.

In one exemplary embodiment, writer control server 230 arranges write requests in the WPQ in the order in which the write requests were received at the write control server 230. In alternate embodiments, write control server 230 attempts to arrange the WPQ in accordance with the precise time sequence in which the write requests were generated by host computers 216, 220. This may be accomplished using one of multiple exemplary implementations.

One exemplary implementation utilizes a reverse handicapping process in which incoming write requests are delayed at the write control server to compensate for transmission delays between a host computer 216, 220 that generated the write request and the write control server 230. The write control server 230 may construct an array that contains the transmission delays associated with host computers 216, 220 connected to the storage network 200. The transmission delay values in the array may be used to compensate for transmission delays when positioning a write request in the WPQ.

The array may be constructed in a background process executed by write control server 230. To construct the array, write control server 230 pings one or more host computers 216, 220 that connect to storage network 200. The host computers 216, 220 respond to the ping. The round trip time (RTT) in the communication path between write control server 230 and the respective host computers 216, 220 is measured. The RTT is divided by two to approximate the transmission delay, or latency, a write request incurs during transmission from the respective host computers 216, 220 to write control server 230. The transmission delays may be stored in a suitable data structure, e.g., an array stored in memory, and logically associated with their respective host computers 216, 220.

To compensate for transmission delays, incoming write requests are delayed at the write control server by a time period equal to the longest delay in the array of transmission delays minus the delay associated with the host computer 216, 220 that originated the request. By way of example, assume that host computer 216 exhibits a transmission delay of 20 nanoseconds (ns), which is the longest transmission delay of all host computers connected to storage network 200. A write request from host computer 216 is not delayed at write control server 230 (because 20 ns-20 ns results in a delay of zero ns). By contrast, assume that host computer 220 exhibits a transmission delay of 14 ns. A write request from host computer 220 will be delayed by six ns (20 ns-14 ns). Thus, the reverse handicapping process attempts to compensate for transmission delays between a host computer 216, 220 and the write control server 230 when positioning write requests in the WPQ.

The process of constructing an array of transmission delays may be performed periodically as a background process, or in response to a write requests from host computers 216, 220. Write control server 230 may ping the host computers 216, 220 once, or multiple times, to derive an average RTT.

In alternate implementations, write requests from host computers 216, 220 are marked with a time stamp indicating a time at which the write request was originated. If the clocks in the host computers 216, 220 are synchronized with the clock in the write control server 230, then the write requests may be positioned in the WPQ in accordance with their respective time stamps. By contrast, if the clocks in the host computers 216, 220 are not synchronized with the clock in the write control server 230, then the transmission delay may be used to position the write requests in the WPQ, as described above.

Referring again to FIG. 5, at operation 518 write control server 230 generates a write access token, which is transmitted to the host computer 216, 220 at the top of the WPQ. The write access token may be embodied as a message from write control server 230, which may include information identifying the write request from the host computer 216, 220 such as, e.g., a sequence number or a time stamp at which the host computer generated the write request. The token may also include a time stamp indicating a time at which write permission was granted by the write control server 230.

The write access token is received by the host computer 216, 220 and at operation 522 the host computer 216, 220 initiates the write operation associated with the write access token. It will be appreciated that a host computer 216, 220 may have multiple outstanding write requests in the WPQ. The write operation may be associated with the write request by matching the sequence number or time stamp returned with the write access token. The write operation may be performed in accordance with normal storage network operations. If the storage network is configured to generate a redundant copy of the data, then redundant copy operations are also executed.

Operations 526 and 530 are optional. At operation 526 a host computer 216, 220 generates a write initiation signal, which is transmitted to write control server 230. The write initiation signal includes information that identifies the write operation and may include a time stamp indicating a time at which the write operation began. At operation 530 write control server 230 stores the write initiation signal in a suitable storage location, e.g., in a memory communicatively connected to write control server 230.

At operation 534 host computer 216, 220 generates a write completion signal when write operations, including any redundant copy operations, are successfully completed or result in failure. The write completion signal is transmitted to write control server 230. If the write completion signal indicates success (operation 538), then write control server 230 transmits a write access token to the host computer 216, 220 associated with the next write request in the WPQ. By contrast, if the write completion signal indicates failure, then all write operations for the data consistency group in the storage network are terminated (operation 542). Write control server 230 may then transmit a write failure signal (operation 546) that triggers failover procedures for the data consistency group in the storage network.

The operations 510-538 permit the write control server 230 to regulate write operations for the data consistency group in the storage network 200 such that only one host computer 216, 220 has write access at any given point in time. Upon successful completion of a write operation by a host computer, e.g., 216, write access is granted to another host computer, e.g., 220. By contrast, failure of a write operation terminates all write operations for the data consistency group in the storage network. Thus, data consistency is always maintained for the data sets in the data consistency group as well as their local or remote replicas.

In an optional feature the write control server 230 may implement a timeout procedure that terminates write operations if a write operation exceeds a time threshold. By way of example, write control server 230 may initiate a timer when the write initiation signal is received in operation 530. If a write completion signal is not received within a predetermined time period, then the write control server may generate a signal that triggers failover procedures for the data consistency group in the storage network.

It will be appreciated that incoming write requests may be received at the write control server 230 and positioned in the WPQ while host computers 216, 220 are executing a write operation. In that regard, operations 510 and 514 may be executed repeatedly independent of the remaining operations illustrated in FIG. 5.

Figure 6:
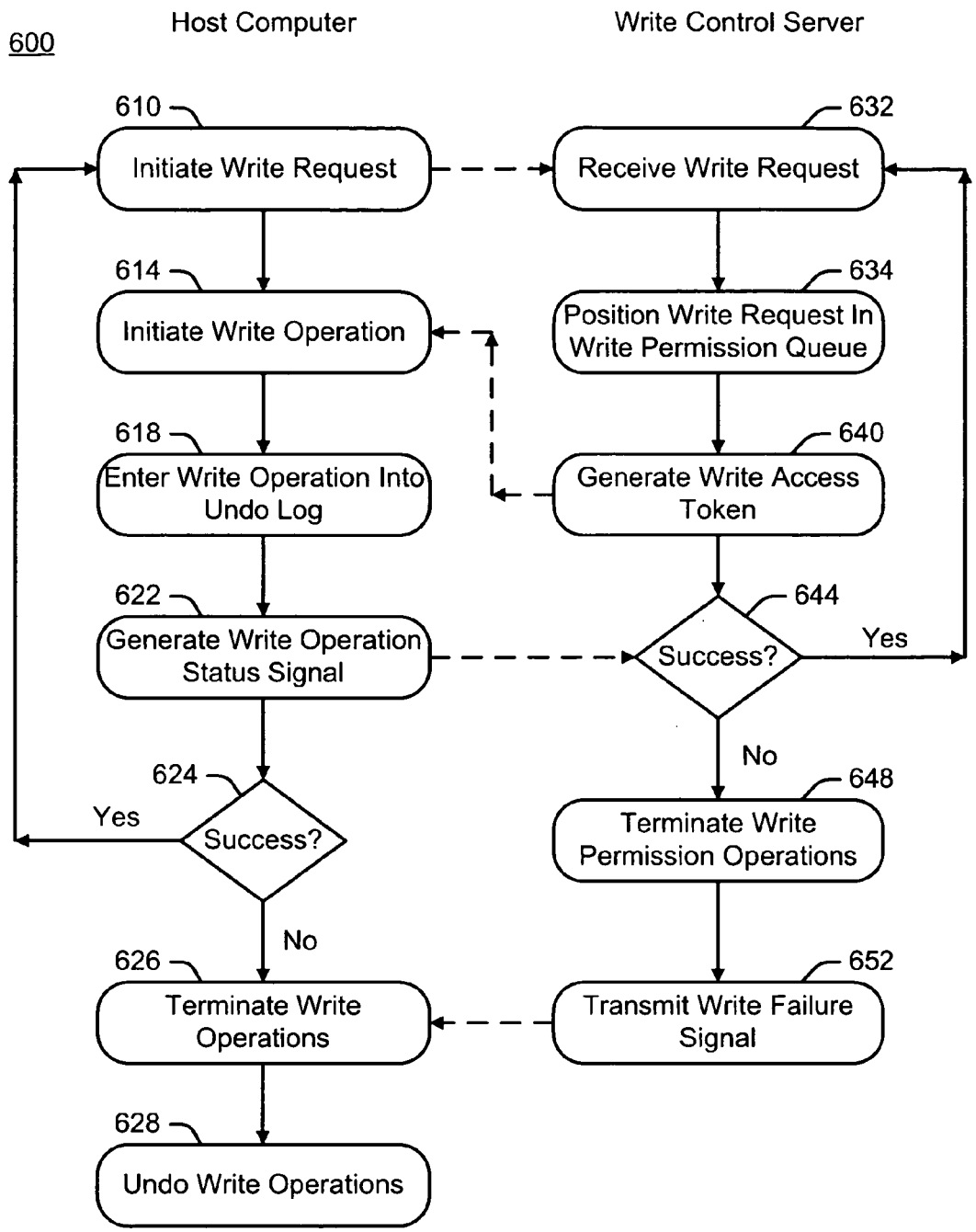
FIG. 6 is a flowchart illustrating operations in a second exemplary implementation for executing write operations in a storage network.

FIG. 6 is a flowchart illustrating operations in a second exemplary implementation for executing write operations in a storage network 200. In the exemplary implementation illustrated in FIG. 6, write control server 230 authorizes write operations for the data consistency group in storage network 200, permits multiple host computers 216, 220 to execute write operations at any point in time, and maintains a response log tracking write operations in the data consistency group. In the event of a write failure, write control server 230 consults the response log to determine a time at which the failed write was authorized and transmits a write failure signal to host computers identified in the response log. In response to the write failure signal, the host computers can undo writes that occurred after the write failure, thus ensuring a consistent data set in the local and replicated data consistency group.

Referring to FIG. 6, at operation 610 a host computer initiates a write request, which is transmitted to write control server 230, e.g., over communication network 212. Write control server 230 receives the write request at operation 632 and, at operation 634, positions the write request in the WPQ. Write control server 230 may implement one of the same procedures for positioning received write requests in the WPQ as described in connection with FIG. 5.

At operation 640 write control server 230 generates a write access token, which is transmitted to the host computer 216, 220 at the top of the WPQ. The write access token may be embodied as a message from write control server 230, which may include information identifying the write request from the host computer 216, 220 such as, e.g., a sequence number or a time stamp at which the host computer generated the write request. The token may also include a time stamp indicating a time at which write permission was granted by the write control server 230. The write access token is transmitted to the requesting host computer 216, 220, and entered into a response log maintained by write control server 230. Entries in the response log comprise an identifier associated with the host computer 216, 220 to which write permission was granted and a time stamp identifying the time at which write permission was granted. The response log may be maintained in a suitable data structure, e.g., an array or a linked list, in a memory location communicatively connected to write control server 230 such as, e.g., the RAM or disk memory of write control server.

The write access token is received by the host computer 216, 220 and at operation 614 the host computer 216, 220 initiates the write operation associated with the write access token. The write operation may comprise remote copy operations as described in connection with FIG. 5. It will be appreciated that a host computer 216, 220 may have multiple outstanding write requests in the WPQ. The write operation may be associated with the write request by matching the sequence number or time stamp returned with the write access token. The write operation may be performed in accordance with normal storage network operations. If the storage network is configured to generate a redundant copy of the data, then redundant copy operations are also executed.

In an exemplary embodiment each host computer maintains an undo log that comprises information required to undo a write operation. An undo log for storage network 200 may comprise entries for the time stamp transmitted with the write access token, a time at which the write operation begins, a time at which the write operation concludes, an address identifying a location at which the contents of the write operation are stored, the contents of the write operation, and the status of the write operation. The undo log should be large enough to enable the host to undo writes that occurred in a time period corresponding to the longest transmission delay between write control server 230 and a host computer 216, 220 in the data consistency group plus the longest write timeout implemented in the data consistency group. At operation 618 the host computer 216, 220 enters the write operation into its undo log.

At operation 622 the host computer 216, 220 generates a write operation status signal, which is transmitted to write control server 230. The write control status signal comprises one or more entries that identify the write operation and an entry that indicates whether the write operation completed successfully or failed. In the event of a failure, the write operation status signal functions as a write failure alarm.

If, at step 624 the host computer 216, 220 determines that the write operation was completed successfully, then the host computer continues normal operations. By contrast, if the write operation failed, then the host computer 216, 220 stops all write operations at operation 626 and consults the undo log to undo any write operations that occurred after the time that permission was granted for the failed write operation (operation 628).

The write operation status signal generated in operation 622 is received at write control server 230, which analyzes the write operation status signal to determine whether it was a success or failure (operation 644). If the write operation completed successfully, then write control server 230 continues normal operations. By contrast, if the write operation failed, then write control server terminates granting permission for write operations (operation 648) and transmits a write failure signal to the host computers 216, 220 in the response log (operation 652). The write failure signal comprises a time stamp identifying the time at which write control server granted permission for the failed write operation.

Upon receipt of the write failure signal, the host computers 216, 220 stop all write operations and consult their undo log to undo any write operations that occurred after the time that permission was granted for the failed write operation, i.e., the host computers execute operations 626 and 628. It will be appreciated that the host computer that experienced the failed write may already have executed operations 626 and 628 based on its own failure information.

The operations illustrated in FIG. 6 enable multiple host computers 216, 220 in the data consistency group to execute write operations at the same time, which provides better performance than the operations illustrated in FIG. 5. In the event of a failed write operation, the local and replica data consistency group is restored to a consistent data state.

In another exemplary implementation the operations illustrated in FIGS. 5 and 6 may be modified slightly to accommodate the introduction of a Uniform Time Broadcaster (UTB) component into the storage network. The UTB component broadcasts a timing signal that may be used by all components in storage network 200. The UTB component may be implemented in write control server 230, e.g., by using the internet Small Computer Serial Interface (iSCSI) broadcast transmission mode, or as a separate component. The timing signal may be broadcast over the communication network 212, or over a separate communication network. The UTB may also be implemented as a receiver of GPS satellite time.

Introduction of a UTB permits write control server 230 to implement a more deterministic process of sorting write requests from host computers 216, 220 in the WPQ. Because the storage network uses uniform timing, write requests may be supplied with a unified time stamp from the originating host, which may be positioned in the WPQ in accordance with the unified time stamp indicating the time at which the write request was generated. Accordingly, a reverse handicapping procedure is not necessary. By contrast, if the write request does not include a unified time stamp from the originating host, then the write control server 230 may optionally implement a reverse handicapping procedure to compensate for transmission delays between the host computer that generated the write request and the write control server. The remaining operations may be implemented as described in FIGS. 5 and 6.

In another exemplary implementation the UTB cooperates with the host computers 216, 220 to eliminate the need for write control server 230 to authorize or track write operations for the data consistency group.

Figure 7:
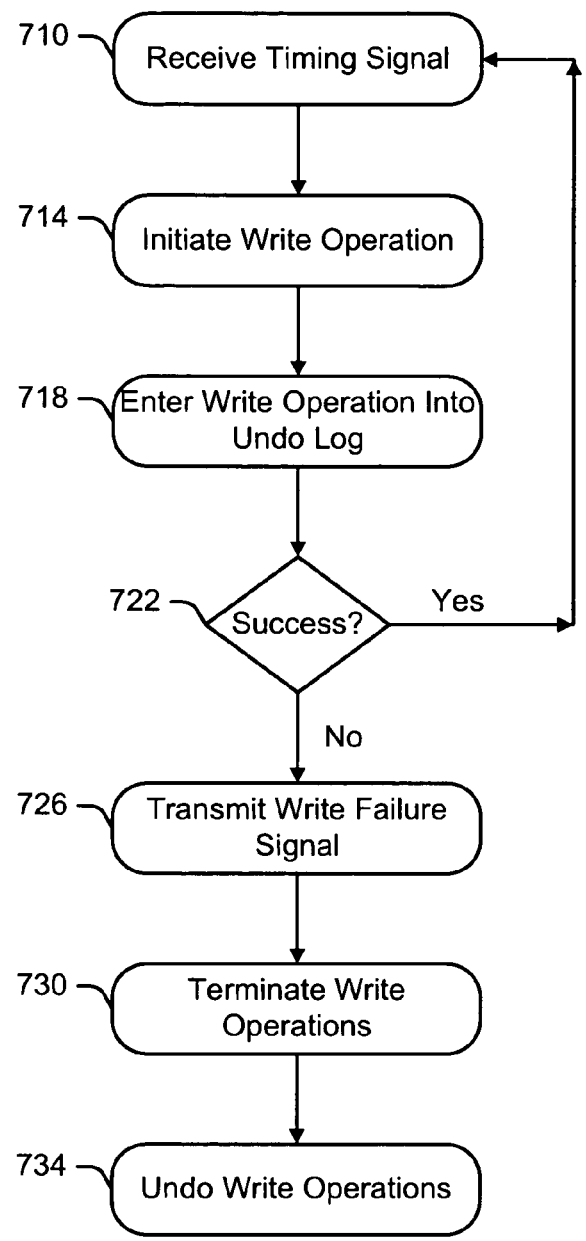
FIG. 7 is a flowchart illustrating operations in a third exemplary implementation for executing write operations in a storage network.

FIG. 7 is a flowchart illustrating operations in a third exemplary implementation for executing write operations in a storage network 200. The operations illustrated in FIG. 7 may be implemented in a processor associated with a host computer in storage network 200.

At operation 710 a host computer 216, 220 receives a signal comprising a timing indicator from the UTB. In an exemplary implementation the UTB constantly broadcasts a timing signal to the host computers in storage network 200, so the host computer 216, 220 constantly receives a clock signal representing the clock signal of the UTB. In alternate embodiments the UTB may periodically transmit a timing signal and the host computers 216, 220 may synchronize their clocks with the clock signal from the UTB or maintain a signal that represents the difference between the UTB timing indicator and a local timer. Thus, the host computers maintain timing information that identifies the timing signal of the UTB. The timing information may be the timing indicator from the UTB, a synchronized local timer, or a signal that represents the difference between the UTB timing indicator and a local timer.

Optionally, the host computer 216, 220 may maintain information about the transmission delay between the UTB and the host computer and may record this information in association with the timing information. For example, the host computer may periodically ping the UTB and determine the RTT for a response from the UTB. The RTT may be divided by two to estimate the transmission delay.

At operation 714 the host computer initiates a write operation, e.g., in response to a write request from a client. At operation 718 the write operation is entered into an undo log. In an exemplary embodiment each host computer maintains an undo log that comprises information required to undo a write operation. The undo log may be implemented substantially as described in connection with FIG. 6. The host computer 216, 220 records in the undo log the timing information that identifies the timing signal of the UTB at the time when the write operation was initiated. This provides an association between the UTB timing indicator and the write operation. The timing information may include the transmission delay.

If the write operation is completed successfully (operation 722), then the host computer 216, 220 continues normal operations, so control may pass back to operation 710. By contrast, if the write operation fails, then control passes to operation 726, and the host computer 216, 220 transmits a write failure signal to other host computers 216, 220 in the storage network 200. The write failure signal includes the timing information that identifies the UTB timing indicator associated with the failed write operation.

In an exemplary implementation the host computer 216, 220 broadcasts the signal directly to other host computers 216, 220 in the storage network, e.g., using the iSCSI broadcast transmission mode. In an alternate implementation, the host computer transmits the write failure signal to write control server 230, which transmits the write failure signal to other host computers 216, 220 in storage network 200.

In response to the write failure signal, at operation 730, the host computers 216, 220 stop all write operations, and at operation 734 the host computers 216, 220 use their respective undo logs to undo any write operations that were initiated after the failed write operation. It will be appreciated that the host computer 216, 220 that originate the write failure signal may execute operations 730 and 734 in response to the local write failure signal.

The operations illustrated in FIG. 7 enable multiple host computers 216, 220 in the data consistency group to execute write operations at the same time, and without central control of write access. In the event of a failed write operation, the data consistency group is restored to a consistent data state.

In addition to the specific embodiments explicitly set forth herein, other aspects and embodiments of the present invention will be apparent to those skilled in the art from consideration of the specification disclosed herein. It is intended that the specification and illustrated embodiments be considered as examples only, with a true scope and spirit of the invention being indicated by the following claims.

What is claimed is:

1. A storage network, comprising:
a plurality of storage cells, at least one storage cell including physical storage media and a storage media controller that controls data transfer operations with the storage media;
a plurality of host computers that initiate write operation requests, and subsequent to the initiated write operation requests, initiate requests to execute write operations to the plurality of storage cells; and
a write control server that regulates the write operations from the plurality of host computers to the plurality of storage cells by positioning received write operation requests in a queue according to a reverse handicapping process that is based on transmission delays from the plurality of host computers to the write control server such that an earlier generated write operation request is positioned in the queue ahead of a later generated write operation request.

2. The storage network of claim 1, wherein the transmission delays are calculated from round trip times of pings sent from the write control server to the plurality of host computers.

3. The storage network of claim 1, wherein the write control server determines a transmission delay for each of the plurality of host computers and positions the write operation requests in the queue according to the transmission delay for each of the plurality of host computers.

4. The storage network of claim 1, wherein the write operation requests are delayed at the write control server by a time period equal to a longest transmission delay of the plurality of host computers minus a transmission delay associated with one of the plurality of host computers.

5. The storage network of claim 1, wherein the transmission delays are calculated from time stamps and indicate an amount of time for a write operation request to travel from one of the plurality of hosts to the write control server.

6. The storage network of claim 1, wherein the write control server grants write permission to only a single host computer in the queue at any point in time.

7. The storage network of claim 1, wherein the write control server generates write access tokens that are transmitted to the plurality of host computers, and wherein host computers in the plurality initiate requests to execute write operations in response to receiving the write access tokens.

8. The storage network of claim 7, wherein write operations are associated with write operation requests by matching an identifier returned with the token.

9. The storage network of claim 1, wherein the write operation requests are positioned in an order in the queue based on a time period for a write operation request to travel from a host to the write control server.

10. The storage network of claim 1, wherein the reverse handicapping process delays the write operation requests to compensate for an estimated travel time from a host computer to the write control server.

11. The storage network of claim 1 wherein in response to receiving requests to execute write operations from the plurality of host computers, at least one storage cell in the plurality contemporaneously writes data from the write operations to one or more copies stored on one or more other storage cells in the plurality.

12. A method executing on hardware of managing data transfer operations between a plurality of host computers and a plurality of data storage devices in a storage network, comprising:
receiving, at a write control server, write requests from the plurality of host computers communicatively connected to the storage network;
storing the write requests in a write permission queue at the write control server; and
positioning the write requests in the write permission queue in an order that compensates for differences in travel times from the plurality of host computers to the write control server such that an earlier generated write request is positioned in the queue ahead of a later generated write request.

13. The method of claim 12, wherein the write requests are positioned in the write permission queue according to a time that the write requests were generated at the plurality of host computers.

14. The method of claim 13, further comprising transmitting a permission signal to a host computer associated with a write request in the write permission queue, wherein the permission signal grants permission to the host computer to initiate write operations, if the status signal indicates that a prior write operation was completed successfully.

15. The method of claim 12, wherein:
the write requests include a time stamp; and
storing the write requests in a write permission queue comprises storing the write requests in order based on the time stamps.

16. The method of claim 12, further comprising implementing a reverse handicapping routine when positioning the write requests in the write permission queue.

17. The method of claim 16, further comprising:
receiving, from a host computer, a status signal indicating that a write operation has failed;
retrieving, the time stamp from the status signal associated with the failed write operation; and
transmitting to at least one host computer a write failure signal comprising the retrieved time stamp.

18. The method of claim 12, wherein the write requests are positioned in the write permission queue according to a reverse handicapping routine that delays the write requests to compensate for an estimated travel time from the plurality of host computers to the write control server.

19. The method of claim 18, wherein, in response to the write failure signal, the at least one host computer reverses write operations performed after a time based on the time indicated on the time stamp.

20. The method of claim 12, further comprising:
receiving, from a host computer, a status signal indicating that a write operation has been initiated, wherein the status signal comprises a time stamp; and
storing the status signal in a memory location communicatively connected to the write control server.

21. One or more computer readable media comprising logic instructions that, when executed on a processor, cause the processor to perform the data transfer operations of claim 12.

22. A method executing on hardware of managing data transfer operations between host computers and data storage devices in a storage network, comprising:
receiving, at a write control server, write requests from the host computers;
storing the write requests in a queue at the write control server such that earlier generated write requests are positioned in the queue ahead of later generated write requests; and
delaying positioning of the write requests in the queue to regulate the initiation of write operations from the host computers to the data storage devices, the delay based on a reverse handicapping process performed at the write control server.

23. The method of claim 22, wherein the reverse handicapping process is based on a longest transmission delay of the host computers minus a transmission delay associated with one of the host computers.

24. The method of claim 22, wherein positioning delays are calculated from round trip times of pings sent from the write control server to the host computers.

25. The method of claim 22 further comprising, ordering the write requests in the queue according to a time required for the write requests to travel to the write control server minus another time required for a write request to travel to the write control server.

26. The method of claim 22 further comprising:
determining a transmission delay for data to travel from a host computer to the write control server;
positioning a write request from the host computer in the queue at the write control server in an order that compensates for the transmission delay.

* * * * *